(12) United States Patent
Puvvada

(10) Patent No.: US 8,012,437 B2
(45) Date of Patent: Sep. 6, 2011

(54) PROCESS FOR SEPARATING IRON FROM OTHER METALS IN IRON CONTAINING FEED STOCKS

(76) Inventor: George Puvvada, Markham (CA)

( * ) Notice: Subject to any disclaimer, the term of this patent is extended or adjusted under 35 U.S.C. 154(b) by 373 days.

(21) Appl. No.: 12/039,315

(22) Filed: Feb. 28, 2008

(65) Prior Publication Data

US 2008/0210537 A1 Sep. 4, 2008

Related U.S. Application Data

(60) Provisional application No. 60/904,186, filed on Mar. 1, 2007.

(51) Int. Cl.
*C01G 1/00* (2006.01)

(52) U.S. Cl. ............... 423/138; 423/150.3; 201/4

(58) Field of Classification Search ............ None
See application file for complete search history.

(56) References Cited

U.S. PATENT DOCUMENTS

| | | | | |
|---|---|---|---|---|
| 2,187,468 A * | 1/1940 | Sullivan et al. | ............... | 423/58 |
| 3,973,949 A * | 8/1976 | Goens et al. | ............... | 205/369 |
| 6,395,242 B1 * | 5/2002 | Allen et al. | ............... | 423/101 |
| 2003/0159540 A1 * | 8/2003 | Frame et al. | ............... | 75/10.28 |

* cited by examiner

*Primary Examiner* — Melvin Mayes
*Assistant Examiner* — Melissa Stalder
(74) *Attorney, Agent, or Firm* — Elias Borges

(57) ABSTRACT

The invention is a method of separating metals such as zinc, lead and cadmium from iron in secondary feed stocks such as EAF Dust, BOF Sludge, mill scale, iron fines, tire dust and other iron and zinc containing residues and dusts. The method includes the steps of reduction roasting the feed stocks at a volatizing temperature sufficient to volatilize the zinc and other metals into metal fumes but insufficient to volatize iron and then collecting the metal fumes as a metal dust. The metal dust is then leached with a leaching liquid to form a leach liquor and a leach residue. The leach liquor is then purified by zinc dust cementation to form a purified liquor and a zinc dust cement residue. The purified liquor is then separated from the zinc dust cement residue, and a zinc recovery step is then performed on the purified liquor.

24 Claims, 3 Drawing Sheets

Pyrometallurgical treatment followed by hydrometallurgical processing of the secondary materials for zinc and iron recovery.

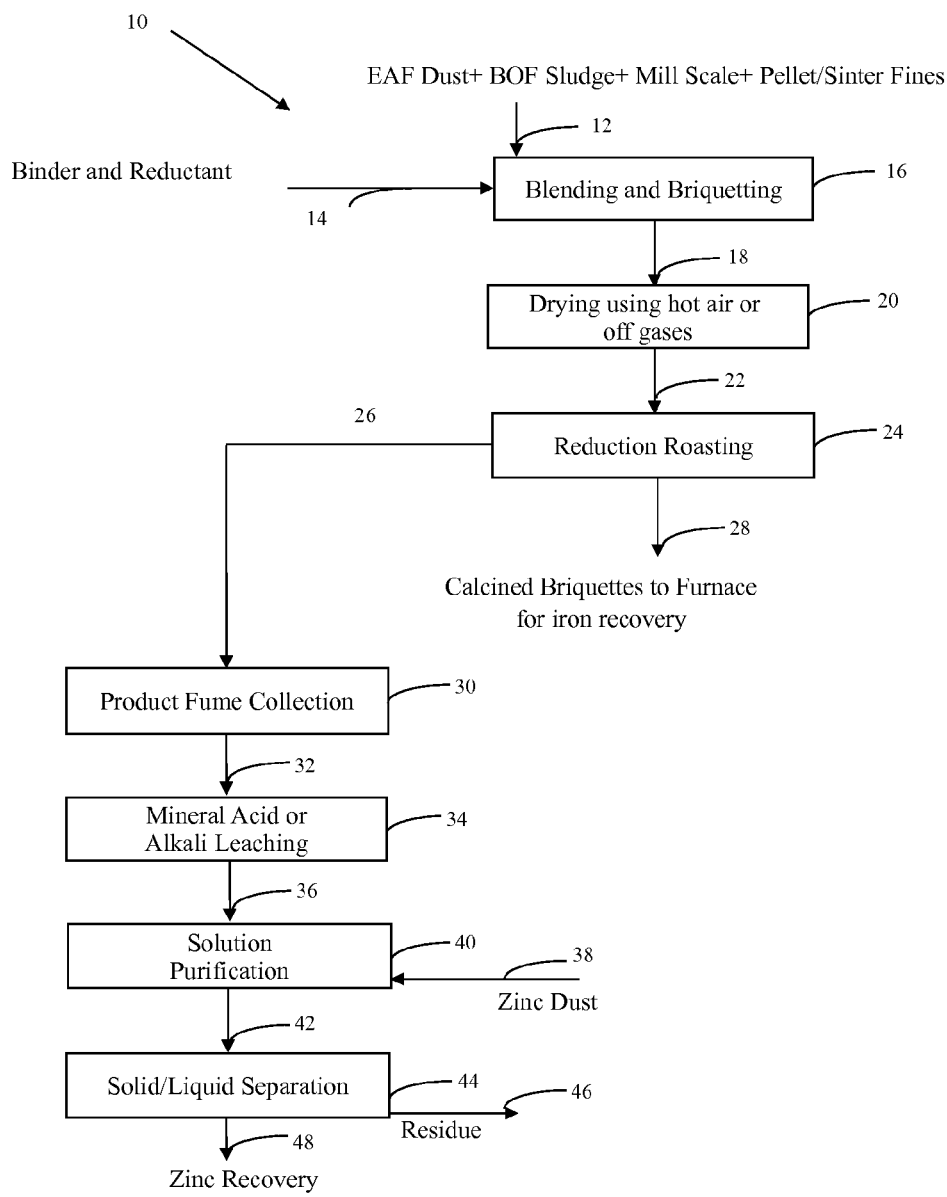
Figure 1: Pyrometallurgical treatment followed by hydrometallurgical processing of the secondary materials for zinc and iron recovery.

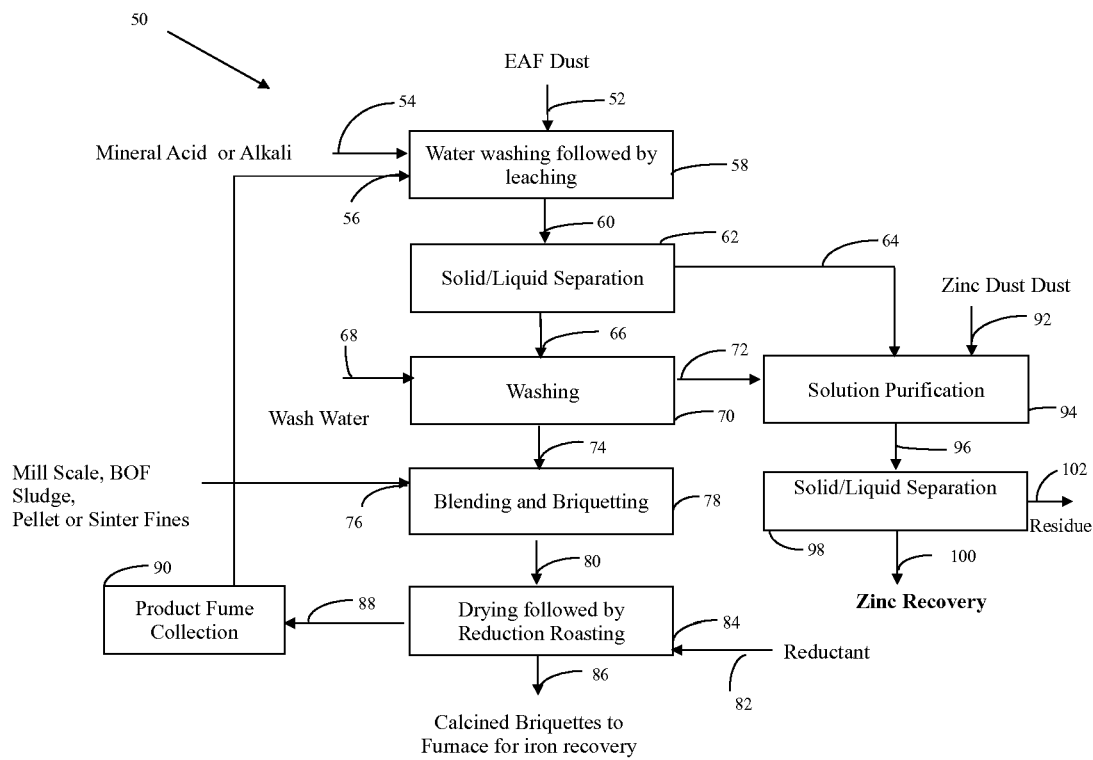
Figure 2: Hydrometallurgical processing followed by pyrometallurgical processing of secondary materials for zinc and iron recovery.

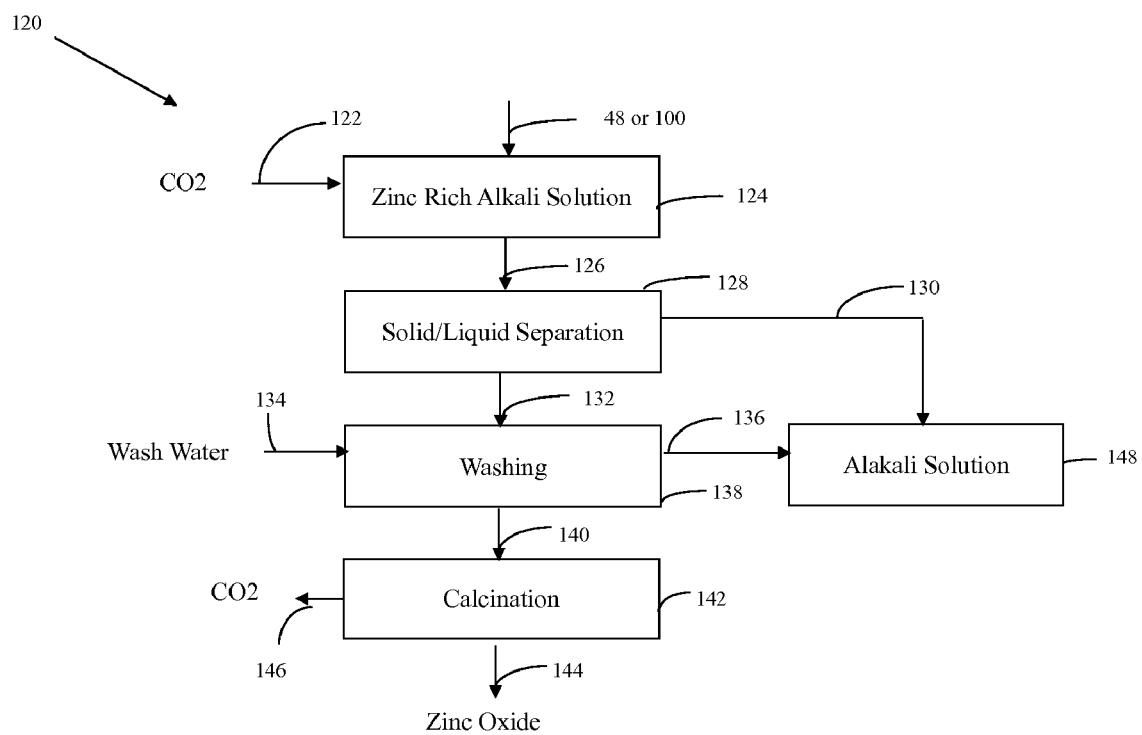
Figure 3: Zinc recovery from alkaline leach solutions

PROCESS FOR SEPARATING IRON FROM OTHER METALS IN IRON CONTAINING FEED STOCKS

CROSS REFERENCE TO RELATED APPLICATION

This application claims priority from provisional application Ser. No. 60/904,186 which was filed on Mar. 1, 2007, the entirety of which is incorporated herein by reference.

FIELD OF THE INVENTION

The invention relates to methods for recovering zinc and iron values from secondary feed stocks such as EAF Dust, BOF Sludge, Mill Scale, Iron Fines, Tire Dust and other iron and zinc containing residues and dusts.

BACKGROUND OF THE INVENTION

Electric arc furnace dust (hereafter referred to as EAF dust) contains elements such as zinc, iron, lead, aluminum, chromium, cadmium, manganese, sodium, potassium, magnesium and calcium. The zinc in the dust is present as zinc oxide and zinc ferrite. The presence of metals such as lead and cadmium in EAF dust make this material a hazardous waste. Disposing of this hazardous waste is expensive and adds to the cost of operating electric arc furnaces. Over the years, attempts have been made to render this byproduct harmless and reclaim some of the constituent elements forming the material in an attempt to lower the costs of disposing of EAF dust. Steel mills using Basic Oxygen Furnace, Blast Furnace and Cupolas generate various iron rich sludges, dusts and mill scales. Recycling these materials economically has become a challenging task to steel mills due to the nature of these secondary materials (referred to as secondary feed stocks).

The recycling of electric arc furnace dusts and various iron bearing secondary materials by pyrometallurgical methods, hydrometallurgical methods and a combination of pyro and hydrometallurgical methods has been the subject of many studies. Pyrometallurgical processes require reducing agents and high temperatures and generally produce a crude zinc oxide of low commercial value. On the other hand hydrometallurgical processes produce high quality metallic zinc or zinc oxide, but most of the processes can not leach zinc completely from zinc ferrite phase unless expensive pressure leaching technology was employed.

The difficulties and drawbacks encountered by several hydrometallurgical technologies developed are discussed. In Canadian patent 1212841 a process for the extraction of zinc from zinc ferrite residues by pressure leaching with sulfuric acid in an autoclave system was disclosed. In Canadian patent 1176853 zinc ferrite was combined with zinc sulfide ore and then pressure treated at elevated temperature to dissolve zinc from the ferrite as well as the sulfide ore. In another Canadian patent 1112880 leaching with aqueous sulfuric acid at an elevated temperature of 140 to 250° C. and 3-40 atm pressure was carried out. These high temperature and high pressure processes are in general are more expensive to the atmospheric leaching processes. In U.S. Pat. No. 4,610,721 atmospherically leaching the steel plant dust in a first stage wherein an amount of steel plant dust is mixed with an amount of acidic zinc sulfate solution to leach zinc there from. Solution pH was controlled between 2.5 and 3.5. Following thickening additional sulfuric acid or the spent electrolyte was added and subjected to pressure leaching. In U.S. Pat. No. 6,338,748 a process was disclosed where hot acid leach containing 37-74 g/L of HCl and 104-270 g/L of $ZnCl_2$ is used. This process claims the dissolution of both zinc oxide and zinc ferrite phases. However, hydrometallurgical processes can not be applied to process other iron bearing materials such as BOF sludge, mill scale and iron ore fines economically as these materials contain zinc values up to about 4%.

Several pyrometallurgical technologies were patented in recent years in US and Canada. Of the various pyrometallurgical studies disclosed, such as U.S. Pat. Nos. 3,770,416; 3,850,613; 4,072,503; 4,396,424; 4,595,574; 4,765,829; 5,013,532; 5,906,671, vaporization of zinc, lead and cadmium from the EAF dust and other zinc containing iron bearing secondary materials was disclosed. In a Canadian and U.S. Pat. Nos. 1,282,965 and 4,800,069, respectively, the recovery of zinc and other metals from strongly bound zinc ferrite compounds are obtained by treating the dust for 1 h at 750° C. with a 20:1 air:chlorine gas mixture whereby zinc, lead and cadmium were removed from the dust as volatilized chlorides. In U.S. Pat. No. 5,906,671 the metals and metal oxides in dust are mixed with a reducing agent and additives, agglomerated, heated above 800° C. and contacted with a flow of inert, reducing or oxidizing gases to volatilize the metals and metal oxides for recovery. In U.S. Pat. No. 4,612,041 and CA 2151195 it was attempted to produce pig iron instead of reduced briquettes or pellets, and it was reported that the pig iron produced contained unacceptable levels of lead. The Waelz process as disclosed in U.S. Pat. No. 4,525,208 consists of mixing the EAF dust with carbon usually in the form of coke or coal and heating the mixture to volatilize zinc. Due to the flow of air during combustion, a substantial amount of iron, calcium, silicon and aluminum compounds are also gas borne within the kiln, and these contaminate the exhaust stream of potentially valuable zinc oxides.

Though the pyrometallurgical processes differed in the techniques such as the type of reactors used, temperatures maintained, amount and type of reducing agent used and in the sequence of oxidation and reduction reactions used, all the processes have resulted in producing a crude zinc oxide product and an intermediate iron product. These processes did not attempt to disclose the method of producing high purity zinc oxide.

In order to overcome the difficulties encountered independently by pyro and hydrometallurgical technologies, inventions using the combination of pyro and hydrometallurgical methods were disclosed: In U.S. Pat. No. 3,676,107 sulfation of the dust, followed by roasting, water leaching was disclosed. However lead was not separated from the iron bearing residue and an additional high temperature operation was needed to remove the small amounts of lead from the iron value, and therefore would not be economical. In U.S. Pat. No. 5,538,532 the EAF dust was heated in the presence of carbon and an additive selected from the group consisting of limestone, silica, calcium chloride and sulfates to a temperature in the range of 1000° C. to 1200° C. and vaporized cadmium, zinc and lead. The condensed vapor dust was slurried in an ammonia-ammonium carbonate solution to dissolve zinc and cadmium. This method still produced an impure zinc oxide that needs to be further refined and does not disclose iron recovery.

In a Canadian patent 2259423 and U.S. Pat. No. 5,942,198 EAF dust is mixed with coal fines to form briquettes. The briquettes are charged to a furnace where zinc is fumed and collected as zinc oxide. The zinc oxide fume thus obtained was leached with ammonium chloride solution at an elevated temperature. The un-dissolved portion of the dust was combined with fresh dust and made into briquettes and charged back to the furnace. In this process the chlorides present in the un-dissolved residue could generate dioxins in the furnace atmosphere due to the addition of coal fines and could cause serious environmental pollution. The zinc values were recovered from intermediate solution phase through water dilution, which means the process requires expensive evaporators to maintain the water balance. In U.S. Pat. No. 6,770,249 EAF dust and other furnace residues were initially fed to the furnace to generate zinc oxide fumes and the zinc oxide fumes were leached in $CaCl_2$ solution and then zinc was recovered as Simonkolleite/zinc-oxychloride/zinc hydroxide product through water dilution.

The paper published in August 1999 Journal of Metals, by I. Palencia et al., on "Recycling EAF Dust Leaching Residue to the Furnace: A Simulation Study", the recycling of EAF dust leach residue to the furnace was disclosed. The disclosure consists of leaching the EAF Dust with sulfuric acid or with NaOH solution and feeding the un-leached residue containing zinc ferrite to the steel mill furnace. This approach has the disadvantage of introducing un-leached lead and zinc content back to the furnace as sulfuric acid does not leach lead and the caustic solution only partially leaches the lead. This not only increases the lead content of the steel, the zinc present in the un-leached residue would enhance the production of EAF Dust. This disclosure does not include recycling the various iron containing secondary sources.

While the above referenced methods have their advantage, none have proven to be commercially successful, usually due to the costs associated with the methods or due to the inefficient removal of the toxic metals. Therefore a more cost effective method to treat not only the EAF dusts but also the other steel making secondary feed stock residues and sludges is highly desirable. The desired method should enable the economical recovery of zinc and iron values from various secondary feed materials containing zinc and iron values. Further the desired method of recycling iron from such materials should involve minimal contamination caused by metals such as zinc, lead and cadmium.

SUMMARY OF THE INVENTION

The present invention is directed at a method of separating iron from valuable metals such as zinc, lead and cadmium from iron containing secondary feed stocks such as furnace dusts, sludge materials and residues generated by electric arc furnace, BOF and sinter furnaces, tire dust and also pellet fines. The method includes blending and briquetting of these secondary materials. The briquettes are then subjected to reduction roasting step where the metals such as zinc, cadmium and lead contained in the briquettes are vaporized and collected in bag houses. The iron rich briquettes are partially sintered during the roasting step and are fed to the electric arc furnace or basic oxygen furnace for steel making. The zinc, cadmium and lead containing fumes are collected from the bag house and are processed for the selective recovery of high purity zinc products using either mineral acids or alkali solutions.

The present invention is also directed at a method of treating iron containing feed stocks such as electric arc furnace dust, wherein the iron containing feed stock is subjected to a leaching step using mineral acid or alkali to selectively leach the zinc oxide phase of the EAF dust. The leach residue is washed and mixed with other secondary materials such as BOF sludge, tire dust, sinter fines and/or pellet fines. During mixing a reductant can be added. Thus mixed material is briquetted and the briquettes are then subjected to a reductive roasting step. The unbleached zinc, lead and cadmium present in the briquettes are fumed off and collected in bag houses. The zinc, lead and cadmium free briquettes are recycled in the steel mill furnaces for iron recovery. The zinc, lead and cadmium rich dust is then processed in the first leaching step for zinc recovery. In the event an alkali is used as a leaching agent in the above mentioned inventive methods, zinc is recovered as zinc carbonate cake by sparging $CO_2$ gas through the zinc rich alkali leach solution.

The present invention is further directed at a method of separating iron from other metals such as zinc, lead and cadmium in iron containing feed stocks. The method includes the steps of forming the feed stock into substantially dry briquettes then reduction roasting the dry briquettes at a volatizing temperature sufficient to volatilize the other metals into metal fumes but insufficient to volatize iron. The metal in the metal fumes are then collected as a metal dust which is then leached with a leaching liquid to form a leach liquor and a leach residue. The leach liquor is then subjected to zinc dust cementation to form a purified liquor and a zinc dust cement residue. The purified liquor is then separated from the zinc dust cement residue, and the purified liquor is then subjected to a zinc recovery step.

The present invention is further directed at a method of separating iron from zinc and other metals in iron and zinc containing feed stocks. The method includes the steps of reduction roasting the feed stocks at a volatizing temperature sufficient to volatilize the zinc and other metals into metal fumes but insufficient to volatize iron then collecting the metal fumes as a metal dust. The metal dust is then leached with a leaching liquid to form a leach liquor and a leach residue. The leach liquor is then purified by zinc dust cementation to form a purified liquor and a zinc dust cement residue. The purified liquor is then separated from the zinc dust cement residue, and a zinc recovery step is then performed on the purified liquor.

The present invention is further directed at a method of separating iron from zinc and other metals in iron and zinc containing feed stocks including the steps of first water washing the iron and zinc containing feed stocks and then leaching the washed feed stocks with a preliminary leach liquid to form a preliminary leach residue and a preliminary leach liquor. The preliminary leach liquor is then separated from the preliminary leach residue and the preliminary leach residue is washed. The washed preliminary leach residue is then mixed with a feed stock mixture to form a treated mix, the feed stock mixture being selected from the group consisting of BOF sludge, mill scale, tire dust, pellet fines and sinter fines. The treated mix is then reduction roasted at a volatizing temperature sufficient to volatilize the other metals into metal fumes but insufficient to volatize iron. The metal fumes are then collected as a metal dust and the metal dust is then leached with the preliminary leach liquor to form a second leach liquor and a second leach residue. The second leach liquor is then purified using zinc dust cementation to form a purified liquor and a zinc dust cement residue. The purified liquor is then separated from the zinc dust cement residue, the purified liquor is then subjected to a zinc recovery step.

BRIEF DESCRIPTION OF THE ATTACHED DRAWINGS

The accompanied drawings, which are included to provide a further understanding of the invention, are incorporated in and constitute a part of this specification. Illustrative embodiments of the invention together with the description serve to explain the principles of the drawings.

FIG. 1 is a schematic representation illustrating the process of the first method of the present invention.

FIG. 2 is a schematic representation illustrating the process of the second method of the present invention.

FIG. 3 is a schematic representation illustrating the process of zinc recovery from purified zinc rich alkaline solutions.

In the drawings like characters of reference indicate corresponding parts in the different figures.

DETAILED DESCRIPTION OF THE INVENTION

The present invention is a method for the treatment of EAF dust, BOF sludge, Sinter Fines, Mill Scale, Tire Dust and Iron Fines for the recovery of high purity zinc and iron values. The basic method consists of blending the secondary materials and forming them into briquettes. For the purposes of this patent application, the term briquettes refers to any structure such as bricks, pellets, agglomerates, granules and the like of any size. This step is followed by reduction roasting/sintering of the briquettes to generate metal fumes, namely zinc, lead and cadmium oxide fumes. The roasting is conducted at a volatizing temperature which is selected to be low enough that it will not volatize iron, but high enough so that it will volatize metals such as zinc, lead and cadmium. Preferably, the volatizing temperature is between about 400° C. to about 1,300° C. It has been discovered that the best results are obtained when the volatizing temperature is between about 800° C. and about 1,300° C. The reduction roasting is carried out for a time period of between about 10 minutes to 6 hours to ensure that substantially all of the zinc, lead and cadmium are volatized. Preferably, the roasting time is generally between about 30 minutes to 2 hours, which yields the greatest zinc, lead and cadmium volatization at the lowest cost in terms of energy expenditure. The metal fumes thus generated are collected as metal dust in bag houses and are then subjected to wet chemical methods to produce high purity zinc salt. The iron rich calcine (un-volatized residue of the roasted briquettes) would then become a feed stock to the steel mill furnaces to produce iron/steel. The method is shown schematically in FIG. 1.

In an alternate embodiment of the present invention, the zinc containing dust is initially treated through wet chemical methods and the residue collected from the filtration step is blended with other secondary materials such as BOF sludge, Mill scale, Tire Dust, Iron Fines and/or Sinter Fines. During blending a reducing agent may be added to the material. Suitable reducing agents include carbon containing ingredients such as hydrocarbons, diesel oil, waste oil, coal fines, coke, and furnace oil. A binding agent may also be added to aid in the formation of the briquettes. Suitable binding agents include starch, limestone, bentonite, molasses, recycled cellulose, cement and tar. The blend is then briquetted and the briquettes were subjected to reduction roasting/sintering step to volatilize metals such as zinc, lead and cadmium. The reductant used are either solid, liquid or gaseous fuels or a combination of such fuels. Thus collected fumes were then treated through the initial wet chemical methods. The calcined briquettes are recycled to the steel mill furnaces for iron values. The method is shown schematically in FIG. 2.

With the basic method, the wet chemical methods include the use of mineral acids and alkalis, whereas in the alternate embodiment of the method the wet chemical methods include the use of mineral acids and alkalis but excludes the use of chloride based acids and salts to avoid dioxin formation during the roasting/sintering step. The minerals acids consist of $H_2SO_4$, $HCl$ and $HNO_3$ and the alkalis consist of $NaOH$, $Na_2CO_3$ and ammonia solutions. Preferably, leaching liquid should have a molarity of between about 0.5M to about 5M and the leaching liquid and material being leached are preferably at a percent solids of between about 5% and about 50%, although percent solids of between about 20% to about 40% are preferred. At percent solids of at least about 20%, the leach liquor becomes sufficiently rich in zinc, lead and cadmium to make further purification and zinc recovery economically feasible. At percent solids of more than about 50%, it becomes nearly impossible to stir the slurry. At about 40% solids, stirring the slurry is practically achievable. The leaching step is preferably performed at a temperature of between ambient and boiling, with the optimal temperature of between about 50° C. and 95° C. The leaching step should continue for a time period of between about 20 minutes to about 6 hours to ensure complete leaching.

The briquetting and roasting or sintering methods are well known to the industry. The briquettes could be cold or hot briquetted. The binders used for making briquettes are well known to the industry and they include materials such as coal fines, tar, bentonite, lime, cement, molasses and starch. The binders can also be used in combination for briquette making. The briquettes can be dried prior to reduction roasting operation using hot air or hot gases coming from the roasting step. The reduction roasting operation can be carried out using either, solid, liquid or gaseous reductants or a combination of the three, depending upon the availability and cost.

The zinc, cadmium and lead containing mineral acids and/or alkaline solutions proceed through a solution purification steps such as pH adjustment, zinc dust cementation and precipitation, prior to a final zinc recovery step.

The zinc recovery step from the acidic solutions include methods well known to the industry such as crystallization and precipitation. The zinc recovery step from purified alkaline solutions is achieved by sparging $CO_2$ gas through the zinc loaded alkaline leach liquor. This produces zinc carbonate precipitate which can be calcined to produce zinc oxide of high purity. The alkaline based zinc containing leach liquor can also be obtained from leaching zinc containing materials such as crude zinc oxides, zinc drosses and zinc skimmings.

FIGS. 1 and 2 shows a schematic representation of an embodiment of the method of the present invention, generally indicated by 10, 50 and 120, in which zinc and iron values are recovered from secondary feed stock such as EAF dusts, BOF sludges, Mill Scale, Sinter Fines and Iron/Pellet Fines. In method 10, the feed stock 12 containing a mixture of EAF dust, BOF Sludge, Mill Scale, Pellet Fines and Sinter Fines, and a binder and reductant stream 14 are fed to a blending and briquetting method 16. In 16 the feed stock, the binder and the reductant are thoroughly mixed and compacted into briquettes of sufficient strength for further processing. The briquettes 18 are subjected to drying in 20 and the dried briquettes 22 are then fed to reduction roasting method 24. During the reduction roasting process 24, volatile metals such as zinc, cadmium and lead are fumed with off gases 26, and are collected in bag house 30. The roasting is conducted at a volatizing temperature which is selected to be low enough that it will not volatize iron, but high enough so that it will volatize metals such as zinc, lead and cadmium. Preferably, the volatizing temperature is between about 400° C. to about 1,300° C. It has been discovered that the best results are obtained when the volatizing temperature is between about 800° C. and about 1,300° C. A minimum roasting temperature of about 400° C. is required to volatize lead. At about 600° C., zinc and cadmium are also volatized. It has been discovered that at roasting temperatures of at least about 800° C., the rate of volatization of zinc, cadmium and lead increases significantly such that the roasting times are sufficiently short that the process becomes economical. Above about 1,300° C. undesirable byproducts of reduction roasting are created which can result in excessive scale formation in the roasting furnaces causing significant maintenance problems. Roasting can be done at above 1,300° C. without scale formation if the roasting furnace are lined with refractory ceramic tiles; however, refractory lined furnaces are expensive and difficult to maintain. Furthermore, the roasting step is not significantly shorter if the roasting temperature exceeds about 1,300° C. and, of course, more energy would have to be expended to roast at temperatures above about 1,300° C. Iron volatizes at a temperature of about 3,000° C., so roasting at or below about 1,300° C. does not volatize any iron. The calcined briquettes 28 are free from metals such as zinc, cadmium and lead, and will be fed to steel mill furnaces for the recovery of iron values. The dust 32 containing zinc, lead and cadmium is subjected to leaching in a tank 34, and the leach slurry 36 obtained purified in tank 40. The solution purification is conducted by adding zinc dust 38 to tank 40. During this step lead and cadmium are cemented out from the solution. The quantity of zinc dust added is selected to ensure that virtually all of the lead and cadmium contained in the leach solution is removed from the leach solution. Preferably, between about 90% to about 120% of the stoichiometrically required amount of zinc dust necessary to remove all of the lead and cadmium from the leach solution is used. The zinc rich solution 42 is separated from the lead and cadmium by conducting solid/liquid separation in tank 44. The lead-cadmium residue 46 is separated and stored for further purification or disposal. Zinc is recovered from the purified zinc solution 48 using crystallization/precipitation methods known to the industry.

In another embodiment of the present invention, generally indicated by method 50, EAF dust 52 is initially leached with either mineral acid or alkali solution 54 in tank 58. The slurry stream 60 produced from the leaching step is subjected to solid/liquid separation step 62, which produced a solution stream 64 and a residue stream 66. The residue stream 66 is washed with wash water 68 in tank 70, a wash solution 72 and a washed residue 74 are produced. The wash residue 74 is mixed with stream 76 containing Mill Scale, BOF sludge, Pellet Fines and Sinter Fines. Blending and briquetting of the mixture is carried out in 78 and the briquettes 80 produced are dried and roast reduced in 84. During reduction roasting reductant 82 is introduced into reactor 84. The calcined briquettes 86 are free from metals such as zinc, cadmium and lead and are suitable for iron recovery in steel mill furnaces. The off gases 88 generated from 84 are collected in bag house 90. The dust from the bag houses is fed to leaching step in tank 58 for the recovery of zinc, cadmium and lead. The leach solution 64 obtained from tank 62, and the wash solution 72 are fed to tank 94 for solution purification. Zinc dust 92 is added to tank 94 for conducting zinc dust cementation, and a slurry 96 is produced. The quantity of zinc dust added is selected to ensure that virtually all of the zinc, lead and cadmium contained leach solution 64 is removed from the leach solution. Preferably, between about 90% to about 120% of the stoichiometrically required amount of zinc dust necessary to remove all of the lead, cadmium and zinc from leach solution 64 is used. The slurry 96 is subjected to solid/liquid separation in tank 98, where a residue 102 containing lead and cadmium is separated from the high purity zinc solution 100. Zinc is recovered subsequently from the purified zinc solution 100 using known methods to the industry such as crystallization and/or precipitation.

In yet another embodiment of the present invention, generally indicated by method 120, the zinc rich alkali solution 48 or 100, is fed to tank 124. $CO_2$ gas 122 is sparged through tank 124 at a rate of between 10 cc/min per liter of solution to about 300 cc/min per liter, to produce zinc carbonate precipitate of high purity. The zinc carbonate containing alkali slurry 126 is subjected to solid/liquid separation in tank 128. The zinc depleted alkali solution 130 is stored in tank 148 for recycling to methods 10 or 50. The zinc carbonate stream 132 is washed with wash water 134 in tank 138, and the wash solution 136 is fed to tank 148. The washed zinc carbonate stream 140 is calcined in 142 to produce high purity zinc oxide 144 and $CO_2$ gas 146.

The method of the present invention will now be further disclosed with reference to the following examples.

Example

The average chemical analysis of various feed stock such as Eaf dust, BOF Sludge, Mill Scale and Pellet Fines are provided in Table 1.

TABLE 1

Chemical analysis of EAF dust, BOF Sludge, Mill Scale and Pellet Fines.

| Element | EAF Dust | BOF Sludge | Mill Scale | Pellet Fines |
|---|---|---|---|---|
| Zn % | 23.0 | 2.30 | — | — |
| Fe % | 24.0 | 41.9 | 76.2 | 61.3 |
| Mn % | 2.20 | 0.60 | 0.70 | 0.23 |
| Pb % | 0.75 | 0.30 | — | — |
| Cr % | 0.15 | 0.06 | — | — |
| Si % | 1.80 | 0.00 | — | 3.00 |
| Al % | 0.70 | 0.20 | — | — |
| Cd % | 0.04 | 0.00 | — | — |
| Ca % | 11.3 | 2.80 | 0.90 | 3.00 |
| Mg % | 3.84 | 1.20 | — | 0.75 |
| Na % | 0.51 | 0.00 | — | — |
| C % | — | — | 0.70 | — |

Step 1 (Blending and Briquetting). A mixture of the four materials shown in Table 1 is prepared by combining equal proportions of each material. Starch and waste oil are added to the mixture as a binder and as a reductant, respectively. The mixture is then processed in a briquetting machine to produce briquettes of sufficient strength for further processing. The briquettes produced were drop tested from a height of 5', and were found to pass the drop test. The briquettes thus produced were initially dried at 60° C. for an hour. A sample was collected from the dried briquettes and was analyzed. The chemical analysis of the dried briquettes is shown in Table 2.

TABLE 2

Chemical analysis of the briquettes.

| | Element | | | | | |
|---|---|---|---|---|---|---|
| | Zn | Fe | Mn | Pb | Cr | Si |
| Wt % | 6.30 | 50.8 | 0.93 | 0.26 | 0.05 | 1.20 |

| | Element | | | | |
|---|---|---|---|---|---|
| | Al | Cd | Ca | Mg | Na | C |
| Wt % | 0.22 | 0.01 | 4.47 | 1.45 | 0.13 | 0.17 |

Step 2 (Reduction Roasting). The briquettes were placed in a tube furnace. At a furnace temperature of 800° C. air was injected into the furnace at a rate of 300 cc/min until the furnace temperature reached 1100° C. At 1100° C. carbon monoxide gas was injected at the rate of 300 cc/min for 3 h. The briquettes were cooled and collected. The weight loss of the briquettes was found to be 47.4%, indicating significant degree of reduction. The briquettes during the reduction roast were also found to be sintered. The sinter product makes an excellent charge to the steel mill furnaces such as blast furnace or for cooling BOF. Thus the entire iron values free from zinc and lead would be recovered. The analysis of the briquette feed and sinter product are given in Table 3.

TABLE 3

The analysis of the pre-reduced and post-reduced briquettes

| Test No. | Time h | Temp °C. | Reagent Type | CO– Flow Rate cc/min | Fe (%) | Zn (%) | Pb (%) | Cd (%) |
|---|---|---|---|---|---|---|---|---|
| Feed | — | — | — | — | 50.8 | 6.3 | 0.26 | 0.01 |
| 1 | 2 | 1000 | CO | 200 | 96.6 | 0.020 | 0.03 | Nil |
| 2 | 2 | 1000 | CO | 300 | 96.6 | 0.006 | 0.03 | Nil |

The removal of zinc was found to be higher at the higher flow rate of CO, i.e., 300 cc/min than at 200 cc/min.

Step 3 (Leaching Step). The leaching step of the present invention consists of leaching the reduction roast furnace dusts and the EAF dusts. In this example the EAF Dust samples were subjected to the leach step. The leach test conditions are shown in Tables 4A and 4B, where the tests were conducted for a period of 1 h to 2 h and between temperatures ranging from ambient to near boiling. The percent solids were maintained between 0.5 and 20. The tests conducted using mineral acids is shown in Table 4A and the tests conducted using alkali solutions is shown in Table 4B. The mineral acids used for the leaching step are HCl, $H_2SO_4$ and $HNO_3$, whereas the alkali used for the leaching step are NaOH, $Na_2CO_3$ and ammonia.

TABLE 4A

Experimental conditions for the leach tests

| Test No. | EAF Wt (g) | Reagent Type Mineral Acid | Reagent Conc. | Soln. Volm. (ml) | % Solids w/w | Time (h) | Temp. (° C.) | Residue Dry Wt (g) | % Wt Loss |
|---|---|---|---|---|---|---|---|---|---|
| 1 | 250 | HCl | 1.0M | 1000 | 20 | 2 | 95 | 225 | 10.0 |
| 2 | 260 | HCl | 2.0M | 1000 | 20 | 2 | 95 | 195 | 25.0 |
| 3 | 300 | HCl | 3.0M | 1000 | 22 | 2 | 95 | 171 | 43.0 |
| 4 | 260 | $H_2SO_4$ | 1.0M | 1000 | 20 | 1 | 95 | | Wt Gained |
| 5 | 300 | $H_2SO_4$ | 1.5M | 1000 | 20 | 1 | 85 | | Wt Gained |
| 6 | 100 | $HNO_3$ | 1.0M | 500 | 9.0 | 1 | 95 | 41.0 | 59.0 |
| 7 | 100 | $HNO_3$ | 2.0M | 500 | 8.5 | 1 | 95 | 40.8 | 59.2 |
| 8 | 300 | $HNO_3$ | 3.0M | 1000 | 20 | 2 | 95 | 177 | 41.0 |

TABLE 4B

Experimental conditions for the leach tests

| Test No. | EAF Wt (g) | Reagent Type Alkali Leach | Reagent Conc. | Soln. Volm. | % Solids | Time (h) | Temp. (° C.) | Residue Dry Wt | % Wt Loss |
|---|---|---|---|---|---|---|---|---|---|
| 9 | 100 | NaOH | 10% | 1000 | 8.3 | 2 | 70 | 85.0 | 15.0 |
| 10 | 50 | NaOH | 25% | 250 | 17.0 | 2 | 95 | 26.5 | 47.0 |
| 11 | 50 | NaOH | 40% | 250 | 12.3 | 2 | 95 | 30.0 | 40.0 |
| 12 | 50 | $Na_2CO_3$ | 20% | 1000 | 4.0 | 2 | 70 | 39.5 | 21.0 |
| 13 | 25 | $Na_2CO_3$ | 20% | 1000 | 2.0 | 2 | 70 | 23.0 | 8.00 |
| 14 | 15 | $Na_2CO_3$ | 20% | 1000 | 1.2 | 2 | 70 | 12.8 | 14.7 |
| 15 | 100 | $Na_2CO_3$ | 20% | 1000 | 7.6 | 2 | 70 | 94.0 | 6.00 |
| 16 | 20 | $NH_3$ | — | 200 | 9.1 | 2 | 25 | 14.5 | 27.5 |
| 17 | 15 | $NH_3$ | — | 200 | 7.0 | 2 | 25 | 11.2 | 25.3 |
| 18 | 10 | $NH_3$ | — | 200 | 4.7 | 2 | 25 | 6.80 | 32.0 |
| 19 | 5 | $NH_3$ | — | 200 | 0.5 | 2 | 25 | 4.00 | 20.0 |

The residue weight losses obtained using HCl and $HNO_3$ solutions was found to be similar at an average of 42%, whereas with $H_2SO_4$ the residue was found to gain weight due to the formation of gypsum in the residue. The residue weight losses obtained using alkali solutions varied significantly. The highest weight loss of 42% was obtained for 25% NaOH solution at 17% solids.

The analysis of various acidic and alkali pregnant leach solutions obtained from the leach tests conducted are shown in Tables 5A and 5B. The extractions obtained for zinc, lead and cadmium are also presented in these tables.

TABLE 5A

The pregnant liquor analysis for the leach tests

| Test No. | Reagent Type Mineral Acid | Soln Volm | Zn (g/L) | Fe (ppm) | Pb (ppm) | Cd (ppm) | % Zn Extrn | % Fe Extrn | % Pb Extrn | % Cd Extrn |
|---|---|---|---|---|---|---|---|---|---|---|
| 1 | HCl | 1000 | 2.02 | Nil | 100 | 10 | 3.50 | Nil | 5.30 | 10.0 |
| 2 | HCl | 1000 | 17.0 | Nil | 220 | 40 | 28.4 | Nil | 11.3 | 38.5 |
| 3 | HCl | 1000 | 46.0 | 19 | 570 | 70 | 66.6 | Nil | 25.3 | 58.0 |
| 4 | $H_2SO_4$ | 1000 | 26.4 | Nil | 5.0 | 10 | 44.1 | Nil | Nil | 10.0 |
| 5 | $H_2SO_4$ | 1000 | 33.0 | 3.8 | 11.0 | 40 | 56.1 | Nil | Nil | 33.3 |
| 6 | $HNO_3$ | 500 | 28.1 | 50 | 610 | 10 | 61.0 | Nil | 40.0 | 12.5 |
| 7 | $HNO_3$ | 500 | 30.0 | 52 | 650 | 40 | 64.0 | Nil | 43.3 | 50.0 |
| 8 | $HNO_3$ | 1000 | 42.0 | 22 | 520 | 68 | 60.8 | Nil | 23.1 | 56.6 |

The test results shown in Table 5A indicate that zinc, lead and cadmium can be selectively extracted from EAF dust using hydrochloric and nitric acid systems, and zinc and cadmium can be selectively extracted using sulphuric acid system. The extractions of iron are negligible in all the leach systems studied.

The test results obtained for the alkaline leach system indicates that sodium hydroxide is by far the best candidate for selective leaching of the zinc and lead from EAF dusts and furnace fumes. In the sodium carbonate leach system zinc most likely precipitated as zinc carbonate and therefore the solution zinc assays were low in zinc tenors.

TABLE 5B

The pregnant liquor analysis for the leach tests

| Test No. | Reagent Type Alkali Solution | Soln Volm | Zn (g/L) | Fe (ppm) | Pb (ppm) | Cd (ppm) | % Zn Extrn | % Fe Extrn | % Pb Extrn | % Cd Extrn |
|---|---|---|---|---|---|---|---|---|---|---|
| 9 | NaOH | 1000 | 0.49 | Nil | 648 | 0.1 | 2.10 | Nil | 86.4 | 0.25 |
| 10 | NaOH | 250 | 20.5 | Nil | 741 | 0.1 | 32.6 | Nil | 18.7 | 0.12 |
| 11 | NaOH | 250 | 18.5 | Nil | 806 | 1.0 | 40.2 | Nil | 53.7 | 1.25 |
| 12 | $Na_2CO_3$ | 1000 | 0.005 | Nil | 166 | 0.1 | Nil | Nil | 44.3 | 0.12 |
| 13 | $Na_2CO_3$ | 1000 | 0.006 | Nil | 109 | 0.1 | Nil | Nil | 58.3 | — |
| 14 | $Na_2CO_3$ | 1000 | 0.009 | Nil | 85 | 0.1 | Nil | Nil | 75.9 | — |
| 15 | $Na_2CO_3$ | 1000 | 0.004 | Nil | 296 | 0.1 | Nil | Nil | 39.5 | 0.25 |
| 16 | $NH_3$ | 200 | 2.54 | Nil | 0.1 | 2.6 | 11.0 | Nil | Nil | 6.5 |
| 17 | $NH_3$ | 200 | 2.11 | Nil | 0.1 | 2.2 | 12.2 | Nil | Nil | 7.3 |
| 18 | $NH_3$ | 200 | 1.76 | Nil | 0.1 | 1.3 | 15.3 | Nil | Nil | 6.5 |
| 19 | $NH_3$ | 200 | 1.30 | Nil | 0.1 | 0.2 | 22.6 | Nil | Nil | 2.0 |

Step 4 (Reductive roasting step). The leach residues obtained from the above leaching studies was combined and blended with equal amounts of BOF sludge, Mill Scale and Pellet Fines. Starch was added to the blend at the rate of 4% to provide strength to the green briquettes along with 7% of liquid fuel such as waste oil, and the briquettes made were found to be strong enough to pass the 5 ft drop test.

The briquettes were placed in a tube furnace. At a furnace temperature of 800° C. air was injected into the furnace at a rate of 300 cc/min until the furnace temperature reached 1100° C. At 1100° C. carbon monoxide gas was injected at the rate of 300 cc/min for 3 h. The briquettes were cooled and collected. The weight loss of the briquettes was found to be 47.4%, indicating significant degree of reduction. The briquettes during the reduction roast were also found to be sintered.

The test results obtained are similar to the data presented in Step 2 and therefore can be referred back to Step 2.

Step 5 (Solution purification step). The solution purification of the acidic and alkaline leach solutions was conducted through zinc dust cementation. The cementation tests were conducted at 70° C. for a period of 1 h by adding zinc dust. The results obtained are presented in Table 6.

TABLE 6

Cementation test results of alkaline leach liquors

| Test No. | Reagent Type | Soln Volm | Before Zn Addition | | | After Zn Addition | | |
|---|---|---|---|---|---|---|---|---|
| | | | Zn (g/L) | Pb (ppm) | Cd (ppm) | Zn (g/L) | Pb (ppm) | Cd (ppm) |
| 1 | HCl | 1000 | 46.0 | 570 | 70 | 47.0 | <1.0 | Nil |
| 2 | $H_2SO_4$ | 1000 | 33.0 | 11.0 | 40 | 34.0 | <1.0 | Nil |
| 3 | $HNO_3$ | 1000 | 42.0 | 520 | 68 | 43.0 | <1.0 | Nil |
| 4 | NaOH | 1000 | 20.5 | 648 | 0.1 | 21.5 | <1.0 | Nil |

Step 6 (Zinc recovery step). The recovery of zinc from purified acidic leach solutions is carried out using crystallization method, which is well known to the industry. The products recovered are zinc chloride from HCl solutions, zinc sulphate from sulphuric acid solutions and zinc nitrate from nitric acid solutions.

The purified zinc containing alkaline leach solutions were subjected to $CO_2$ sparging for a period of 2 h at room temperature. The gas flow rate was maintained around 50 cc/min, per liter and the zinc carbonate precipitate obtained was filtered, washed, dried and calcined at 500 C for 1 h. The ammonia solution results presented in Table 7 are for synthetic solutions prepared in the laboratory. The test results obtained are shown in Table 7.

TABLE 7

Zinc oxide production from alkaline leach liquors

| Test No. | Reagent Type | Soln Volm | Feed Zn (g/L) | $CO_2$ cc/min | Time h | Filtrate Zn (g/L) | Dry Wt $ZnCO_3$ (g) | Dry Wt ZnO (g) |
|---|---|---|---|---|---|---|---|---|
| 1 | NaOH | 1000 | 16.0 | 50 | 2 | 3.0 | 25.0 | 16.0 |
| 3 | Ammonia | 1000 | 12.0 | 50 | 2 | 3.1 | 17.0 | 11.0 |

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

The invention claimed is:

1. A method of separating iron from other metals including zinc in iron and zinc containing feed stocks comprising the steps of:
   forming the feed stocks into substantially dry briquettes;
   reduction roasting the dry briquettes at a volatizing temperature sufficient to volatilize the other metals into metal fumes but insufficient to volatize iron;
   collecting the metal fumes as a metal dust;
   leaching the metal dust with a leaching liquid to form a leach liquor and a first leach residue;
   purifying the leach liquor using zinc dust cementation to form a purified liquor and a zinc dust cement residue;
   separating the purified liquor from the zinc dust cement residue, and
   subjecting the purified liquor to a zinc recovery step.

2. The method of claim 1 wherein the leaching liquid is acidic and wherein the zinc recovery step comprises zinc salt crystallization.

3. The method of claim 1 wherein the leaching liquid is alkaline and the zinc recovery step comprises zinc carbonate precipitation.

4. The method of claim 1 wherein the step of forming the dry briquettes comprises the steps of water washing the iron and zinc containing feed stocks and then leaching the washed feed stocks with a preliminary leach liquid to form a preliminary leach residue and a preliminary leach liquor, separating the preliminary leach liquor from the preliminary leach residue, water washing the preliminary leach residue, mixing the washed preliminary leach residue with a feed stock mixture to form briquettes, the feed stock mixture selected from the group comprising BOF sludge, mill scale, tire dust, pellet fines and sinter fines, then substantially drying the formed briquettes.

5. The method of claim 4 wherein a binding agent is added to the feed stock mixture to form the briquettes.

6. The method of claim 5 wherein the binding agent is selected from the group consisting of starch, limestone, bentonite, molasses, recycled cellulose, cement and tar.

7. The method of claim 4 wherein a reductant is added to the feed stock mixture to form the briquettes.

8. The method of claim 7 wherein the reductant is selected from the group consisting of hydrocarbons, diesel oil, waste oil, coal fines, coke, and furnace oil.

9. The method of claim 1 wherein the reduction roasting of the dry briquettes is carried out in an atmosphere resulting from the burning of a carbon source selected from the group consisting of coal fines, natural gas, carbon monoxide and hydrocarbons.

10. The method of claim 1 wherein the volatizing temperature is selected to be high enough to volatize zinc, lead and cadmium but not iron.

11. The method of claim 1 wherein the volatizing temperature is between about 400° C. and about 1,300° C.

12. The method of claim 1 wherein the volatizing temperature is between about 800° C. and about 1,300° C.

13. The method of claim 1 wherein the leaching liquid is selected from the group consisting of HCl, $H_2SO_4$ and $HNO_3$.

14. The method of claim 13 wherein the leaching liquid has a molarity of between about 0.5M to 5M and wherein the leaching occurs at a leaching temperature of between about ambient to about boiling for a time period of between about 20 minutes to about 6 hours and wherein the leaching liquid and metal dust are mixed to a percent solids of between about 5% to about 50%.

15. The method of claim 13 wherein the leaching liquid has a molarity of between about 1M to 3M and wherein the leaching occurs at a leaching temperature of between about 50° C. to about 95° C. for a time period of between about 1 hr to about 2 hours and wherein the leaching liquid and metal dust are mixed to a percent solids of between about 20% to about 40%.

16. The method of claim 1 wherein the leaching liquid is selected from the group consisting of NaOH, $Na_2CO_3$ and ammonia.

17. The method of claim 16 wherein the leaching liquid has a molarity of between about 0.5M to 5M and wherein the leaching occurs at a leaching temperature of between about ambient to about boiling for a time period of between about 20 minutes to about 6 hours and wherein the leaching liquid and metal dust are mixed to a percent solids of between about 5% to about 50%.

18. The method of claim 16 wherein the leaching liquid has a molarity of between about 1M to 3M and wherein the leaching occurs at a leaching temperature of between about 50° C. to about 95° C. for a time period of between about 1 hr to about 2 hours and wherein the leaching liquid and metal dust are mixed to a percent solids of between about 20% to about 40%.

19. The method of claim 1 wherein the zinc dust cementation is carried out by adding a quantity of zinc dust to the leach liquor, the quantity of zinc dust being selected to remove substantially all of any lead and cadmium in the leach liquor.

20. The method of claim 19 wherein the quantity of zinc dust added is between about 90% to about 120% of a stoichiometric required amount of zinc dust necessary to remove all of the lead and cadmium in the leach liquor.

21. The method of claim 3 wherein zinc carbonate precipitation is carried out by passing $CO_2$ gas through the purified liquid.

22. The method of claim 4 wherein the leaching liquid for leaching the metal dust is comprised of the preliminary leach liquor resulting from the preliminary leaching of the washed feed stocks.

23. A method of separating iron from zinc and other metals in iron and zinc containing feed stocks comprising the steps of:
- reduction roasting the feed stocks at a volatizing temperature sufficient to volatilize the other metals into metal fumes but insufficient to volatize iron;
- collecting the metal fumes as a metal dust;
- leaching the metal dust with a leaching liquid to form a leach liquor and a leach residue;
- purifying the leach liquor using zinc dust cementation to form a purified liquor and a zinc dust cement residue;
- separating the purified liquor from the zinc dust cement residue, and
- subjecting the purified liquor to a zinc recovery step.

24. A method of separating iron from zinc and other metals in iron and zinc containing feed stocks comprising the steps of:
- water washing the iron and zinc containing feed stocks and then leaching the washed feed stocks with a preliminary leach liquid to form a preliminary leach residue and a preliminary leach liquor, separating the preliminary leach liquor from the preliminary leach residue, water washing the preliminary leach residue, mixing the washed preliminary leach residue with a feed stock mixture to form a treated mix, the feed stock mixture selected from the group consisting of BOF sludge, mill scale, tire dust, pellet fines and sinter fines;
- reduction roasting the treated mix at a volatizing temperature sufficient to volatilize the other metals into metal fumes but insufficient to volatize iron;
- collecting the metal fumes as a metal dust;
- leaching the metal dust with the preliminary leach liquor to form a second leach liquor and a second leach residue;
- purifying the second leach liquor using zinc dust cementation to form a purified liquor and a zinc dust cement residue;
- separating the purified liquor from the zinc dust cement residue, and
- subjecting the purified liquor to a zinc recovery step.

* * * * *